D. Boardman,

Dining Table.

No. 109,107.   Patented Nov. 8. 1870.

Witnesses:
A. A. Yeatman,
W. L. Sheppard

Inventor.
David Boardman
per
Alexander & Mason
Attys

United States Patent Office.

DAVID BOARDMAN, OF COLUMBUS, INDIANA.

Letters Patent No. 109,107, dated November 8, 1870.

IMPROVEMENT IN DINING-TABLES.

The Schedule referred to in these Letters Patent and making part of the same.

I, DAVID BOARDMAN, of Columbus, in the county of Bartholomew and State of Indiana, have invented an Improvement in Dining-Tables, of which the following is a specification.

My invention relates to the combination of a rotary center, with an outside stationary rim, in such a manner that it may be rotated to the right or left, either by knobs fastened on the rotary center, or by a crank and gearing properly adjusted. The object of my invention being to pass tea, coffee, or any of the various articles of food directly in front of a person or persons sitting at the table without incommoding them, thereby doing away with a large proportion of hired help, besides no risk of incurring the displeasure of guests by spilling coffee or other articles of food upon them.

Figure 1 is a perspective view, with rotary center A detached, without gearing E and crank-shaft F.

Figure 2 is a side elevation, embodying my invention, and showing a detached portion of the same.

A is the rotary center, which should be substantially constructed to prevent warping or twisting. The table to be made in whole or in part of wood, metal, or marble.

B is the stationary rim, octagonal in form, with a circular hole, to accommodate the raised under surface of rotary center A.

In order to complete stationary rim B, leaf $b$ must be raised on each side of table, which is attached on the under side by hinges.

The rotary center A, when desired without gearing E E', is rotated by knobs $a$.

E E' is the gearing.

F is the crank-shaft, with the handle $f$, by which motion is communicated to the gearing E and the operative parts.

G is the stirrup, mortised into girth $g$ for spindle $a$ $a$ to rest in.

Girth $g$ has a hole in the center, through which spindle $a$ $a$ is passed, thereby giving support and stability to rotary center A.

H is the table-frame.

Crank-shaft F is held in place by a hanger fastened to table-frame H.

Gearing E E' and crank-shaft F may be dispensed with, according to the wants of different individuals.

I claim as my invention—

The arrangement, with table B, of the circular center A, with spindle $a$, girth $g$, gearing E E', and crank-shaft F, all as set forth.

DAVID BOARDMAN.

Witnesses:
F. WINTER,
O. S. COLLIER.